Aug. 30, 1955     M. PALMER     2,716,706
AUTOMATIC EMERGENCY ELECTRICAL SYSTEMS
Filed May 20, 1954
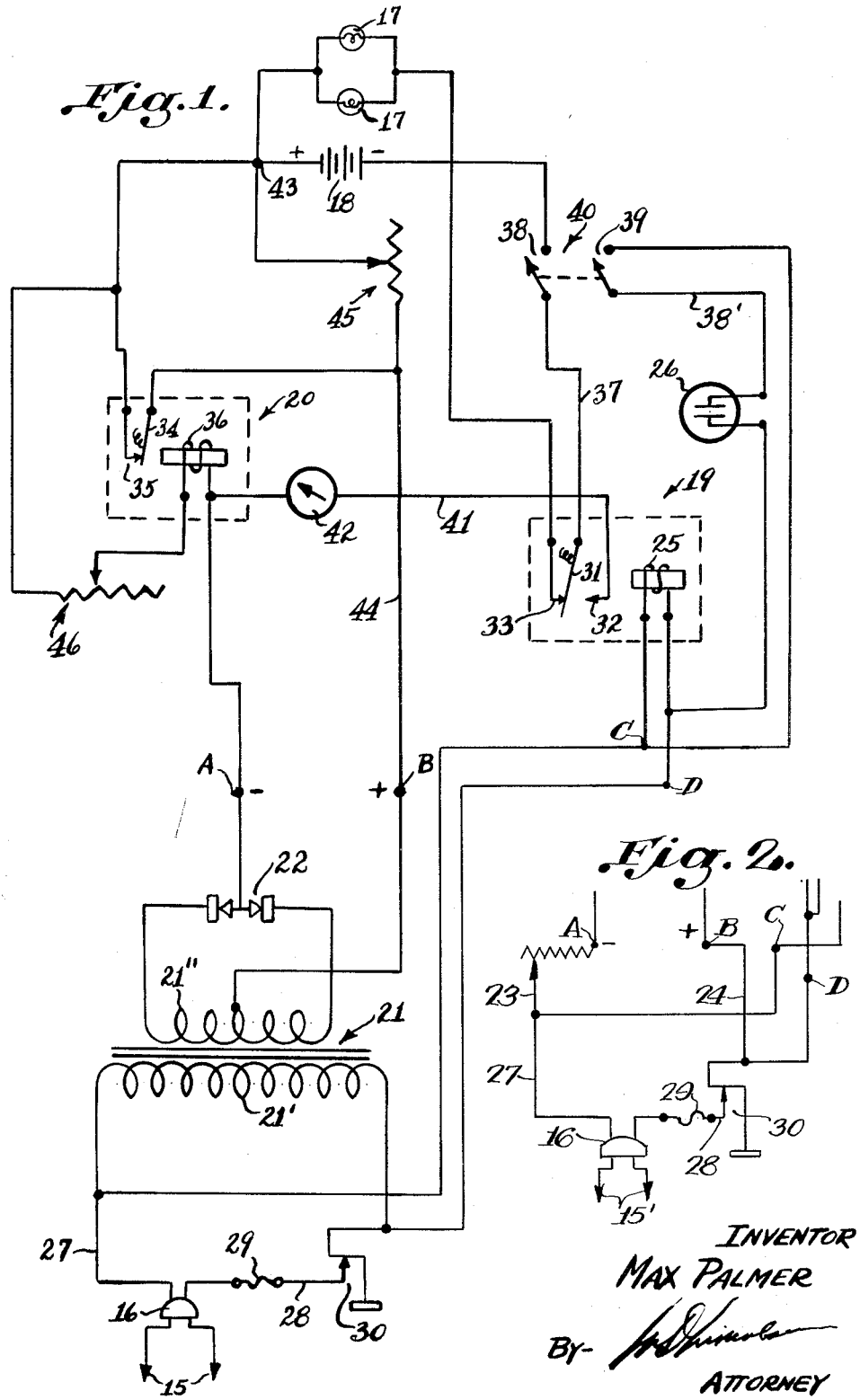
INVENTOR
MAX PALMER
BY-
ATTORNEY

United States Patent Office 2,716,706
Patented Aug. 30, 1955

2,716,706

AUTOMATIC EMERGENCY ELECTRICAL SYSTEMS

Max Palmer, Jackson Heights, N. Y., assignor to Hobby & Brown Electronic Corporation, Rockville Center, N. Y., a corporation of New York Application May 20, 1954, Serial No. 431,077

5 Claims. (Cl. 307—66)

The present invention relates to an electrical system which automatically operates electrical apparatus upon the failure of a current supply operating other electrical apparatus. As a matter of example, the teachings of this invention may be employed to operate an auxiliary lighting system when the current in the main lighting system fails.

An object of this invention is to provide a novel and improved electrical system of the character mentioned, including an auxiliary electrical system powered by a storage battery which is charged by the main current supply, automatically maintained at a proper charge and which is automatically made to operate auxiliary apparatus upon failure of the main current supply.

Another object of this invention is to provide a novel and improved electrical system of the type described, affording adjustments for its sensitivity and performance, having a new mode of operation and embodying means to readily and easily determine whether it is in operative condition.

A further object hereof is to provide a novel and improved electrical apparatus which can be assembled into a compact portable structure and accomplish the aforementioned purposes efficiently and with certainty.

Another object hereof is to provide a novel and improved electrical system of the kind set forth, which is reasonably cheap to manufacture, easy to use, simple to understand and adaptable for use with main systems powered by either alternating or direct current.

Other objects and advantages will become apparent as this disclosure proceeds.

In the accompanying drawing which is part of this specification, similar characters of reference indicate corresponding parts in all the views.

Fig. 1 shows a circuit diagram of an electrical system embodying the teachings of this invention. This is the auxiliary apparatus to be associated with the power lines of a main circuit; such power lines carrying alternating current.

Fig. 2 shows a fragment of said circuit diagram, changed so that such system is for use where the power lines of the main circuit carry direct current.

As shown in the drawings, connection of the auxiliary apparatus to the main lines 15 or 15' as the case may be, is conveniently made by use of a plug 16. As will be explained, should there occur a failure of power in said lines in either embodiment illustrated, there are electric lamps 17 which will be automatically operated by a storage battery 18, the control of whose charge and whose operation is accomplished with apparatus including a first relay indicated generally by the numeral 19 and a second relay designated generally by the numeral 20.

Commercial power lines are of higher voltage than is required to charge the storage battery 18. When they are alternating current power lines 15 as in Fig. 1, it is necessary to employ a step-down transformer denoted generally herein by the numeral 21 and a rectifier 22 to offer the necessary direct current supply across the points or terminals marked "A" and "B." If the current in the main power lines is direct as in 15' in Fig. 2, then of course, said transformer and rectifier are omitted and said terminals "A" and "B" are directly connected to the main power lines, except that to attain the required lower voltage for charging the battery 18, suitable means as a resistance 14 would need be included as shown. With use of main direct current systems, the connections to the terminals "A" and "B" are shown by connectors indicated by the numerals 23 and 24 and as mentioned, the transformer 21 and its associated rectifier 22 are omitted. In all other respects, the systems of both Figs. 1 and 2 are identical. The entire showing in Fig. 1 of apparatus and connections appearing upwards of the points designated by the letters "A," "B," "C" and "D," shall be deemed repeated in the showing in Fig. 2. In any event, across the terminals "A" and "B" in each of the systems illustrated, there is a suitable direct current supply to effect charging of the battery 18.

The significance of the terminals "A" and "B" having been explained, and that is that power across them is derived from the main power lines and that across such terminals there is direct current, I will now proceed to describe the system assuming power in the main lines 15 to be alternating current. Those versed in the art will readily understand the adaptation for direct current main lines as shown in Fig. 2.

Essentially, the primary coil 21' of the transformer, the electro-magnet coil 25 of the relay 19 and the pilot lamp 26, are in parallel electrical connection across the main lines 15. The numeral 27 denotes one of the lead wires connecting one of the prongs of the plug connected to one terminal of each of said coils and lamp. The other lead wire from the other prong of the said plug 15, is denoted by the numeral 28, is connected to the other terminals of said coils and lamp, and may have interposed therein in series, a fuse 29 and a spring-loaded button switch 30. Said fuse is to protect the auxiliary circuit shown in the drawing from any overload in the main circuit and to protect the main circuit from any short-circuit which might result from a defect in the auxiliary circuit. The button switch 30 is used to simulate a failure of power in the main lines 15 by cutting off the power of said main lines from the auxiliary circuit, to test whether the auxiliary circuit is in operative condition.

The relay 19 is really an electro-magnetically operated single pole, double throw switch, whose blade is the armature 31 and whose contact points are 32 and 33. When the magnet coil 25 of said relay 19 is actuated, the armature 31 is brought into contact with point 32. When no current is flowing through said magnet coil 25, its armature 31 is in contact with the point 33; said armature being spring-loaded to attain such normal rest position. The relay 20 is really an electro-magnetically operated single pole, single throw switch, whose blade is the armature 34 and whose contact point is 35. Such switch is open when the magnet coil is actuated because armature 34 is pulled away from the contact point 35. When said magnet coil 36 is inactive or the current therethrough insufficient to attract the armature 34, the latter being spring-loaded, said switch is closed, because armature 34 remains in contact with the point 35.

One terminal of the lamps 17, is connected to the contact point 33. One terminal of the storage battery 18 is connected to the armature 31, by a connector 37, in which a switch 38 may be interposed. In one of the connectors, say 38', connecting the lamp 26, a switch 39 may be interposed. Said switches 38, 39 may be in the form of a double-pole, single throw switch indicated generally by the numeral 40.

The terminals "A" and "B" are the direct current output terminals of the rectifier 22. Thermincal "A" is connected by a connector 41 to the contact point 32, in which connector is interposed an ammeter 42, if desired. The second terminal 43 of the battery 18, is connected to the terminal "B" by the connector 44, in which is interposed the variable resistance 45. The terminals of said resistance 45 are respectively connected to the armature 34 and the contact point 35. One terminal of magnet 36 is connected to contact point 32, while its other terminal in series with the variable resistance 46 is connected to battery terminal 43.

Consider the plug 16 connected across the power lines 15. Upon closing the switch 40, pilot lamp 26 will glow, magnet coil 25 will become actuated whereupon its armature 31 will be brought into contact with point 32 and there will be a direct current potential across the terminals "A" and "B" because primary coil 21' of the transformer 21 will receive power from the main lines 15 and the current induced thereby in the secondary coil 21" of said transformer will be rectified by 22. The current across "A," "B" will charge the battery 18, because it will flow from the positive terminal "B" in succession as follows: through the connector 44, armature 34, point 35, through said battery 18, through connector 37, armature 31, point 32, connector 41 to negative terminal "A." When said storage battery 18 is say near three-quarters full charge, the current in the magnet coil 36 received from said battery will be sufficient to actuate said magnet coil 36 to attract its armature 34, thereby interposing the resistance 45 in the connector 44 and hence in series with the battery 18. Said magnet coil 36 receives current from said battery as follows: From positive terminal 43 of said battery 18, current will flow in succession as follows: through resistance 46, through coil 36, through connector 41, point 32, armature 31, through connector 37 to the negative terminal of the battery 18. Meter 42 will indicate the current in such battery circuit.

In the event of a failure in the main power lines 15, magnet coil 25 will become deenergized and armature 31 will spring back into contact with point 33, whereupon the lamps 17 will light because they will be then directly across the terminals of the storage battery 18. Current will flow from the positive terminal 32 of said battery, through said lamps 17, to contact point 33, armature 31, through connector 37 to the negative terminal of said battery. The battery will continue to operate said lamps until its charge is spent or until power is restored in the main lines 15, whereupon magnet coil 25 will be energized, thereby disconnecting said lamps 17 from the battery because armature 31 will be away from contact point 33. Of course, upon failure in the main power lines 15, lamps 26 will be without current and so will the transformer 21.

The resistance 46 is chosen and so regulated that when the battery 18 is charged to a predetermined extent, the current from the battery will be sufficient to actuate the magnet coil 36 to attract the armature 34. While said armature is away from contact point 35, the resistance 45 will be interposed in series with the battery and thus lower the amount of charge received by the battery from the direct current potential across the terminals "A," "B." Said resistance 45 is so chosen and adjusted that while in circuit, it will permit a mere "trinkle" charge to the battery.

If the lamp 26 is in working order and the plug 16 is connected across the main power lines, the presence of its glow will indicate that power is being applied to the auxiliary system illustrated in the drawing. When the battery 18 has sufficient charge to operate the lamps 17, the operativeness of the auxiliary system can be tested by opening the switch 30 which will disconnect the power lines, whereupon coil 25 will be deenergized and lamps 17 actuated by the battery 18.

Should the charged battery fall in power below a predetermined minimum which is determined by resistance 46, coil 36 will become deenergized, resistance 45 will be shunted by contact of the armature 34 with point 35, and the battery 18 will thus become subject to full charging current from the direct current source whose terminals are "A" and "B."

This system described, therefore automatically charges the battery 18 and maintains its charge and upon failure in the main power lines, will automatically cause the actuation of the auxiliary lamps 17 or other power-consuming apparatus in place of such lamps. In essence, upon failure of power in one circuit, an auxiliary circuit will become actuated automatically. The use of lamps 17 is indicated as merely illustrative and not restrictive in the employment of the teachings of this invention.

Meter 42 to show battery condition, switches 30, 40, fuse 29 and lamp 26, are included for convenience and may be omitted if desired. The system remains operative without their presence therein.

The apparatus shown, permits its inclusion within a compact portable cabinet which may be carried by hand.

This invention is capable of various forms and numerous applications without departing from the essential features disclosed herein. It is therefore intended and desired that the embodiment shown shall be deemed illustrative and in no manner restrictive and that the patent shall cover all patentable novelty herein set forth; reference being had to the following claims rather than to the specific description herein to indicate the scope of this invention.

I claim:

1. In an electrical system of the character described, a source of power to supply energy to a circuit, a storage battery, auxiliary electrical apparatus to be operated by said battery, means operated by said source, adapted to charge said battery; said means having output terminals, a first relay comprising an electro-magnet electrically connected whereby it is actuated by said power source, spaced first and second contact points and a spring-loaded armature positioned between said contact points; said first armature being normally in contact with said first contact point while the said first electro-magnet is deactuated and adapted to be moved by said electro-magnet when the latter is actuated, to a position where said armature is in contact with the second contact point and away from the first contact point, a second relay comprising a second electro-magnet, a third contact point and a second spring-loaded armature positioned between said third contact point and the second electro-magnet; said second armature being normally in contact with the third contact point and when the current flowing through the second electro-magnet is sufficient to actuate such electro-magnet to move the second armature; said second armature is moved to a position where it is away from said third contact point, a resistance; the terminals of said resistance being respectively electrically connected to the second armature and the third contact point; one terminal of the storage battery being electrically connected to one terminal of the auxiliary apparatus, to one terminal of said resistance and to one terminal of the second electro-magnet; the other terminal of the second electro-magnet being electrically connected to one of said output terminals and to the first contact point; the other terminal of said resistance being electrically connected to the other of said output terminals; the other terminal of said storage battery being electrically connected to the first armature and the other terminal of the auxiliary apparatus being electrically connected to the first contact point.

2. The electrical system as defined in claim 1, wherein said resistance is adjustable.

3. The electrical system as defined in claim 1, including a variable resistance interposed in the connection between the third contact point and the second electro-magnet.

4. The electrical system as defined in claim 1, wherein said resistance is adjustable and including a variable resistance interposed in the connection between the third contact point and the second electro-magnet.

5. The electrical system as defined in claim 1, wherein the said source of power is an alternating current and the means for charging the battery includes a transformer operated by said power source and means rectifying the output of said transformer; said rectifying means presenting the mentioned output terminals.

References Cited in the file of this patent

UNITED STATES PATENTS

| | | |
|---|---|---|
| Re. 19,848 | Beetem | Feb. 11, 1936 |
| 2,139,330 | Gilson | Dec. 6, 1938 |
| 2,203,907 | Hines | June 11, 1940 |